(12) United States Patent
Wu et al.

(10) Patent No.: US 11,668,790 B2
(45) Date of Patent: Jun. 6, 2023

(54) RADAR COMMUNICATIONS WITH OVERSAMPLING

(71) Applicant: NXP B.V., Eindhoven (NL)

(72) Inventors: Ryan Haoyun Wu, San Jose, CA (US); Dongyin Ren, East Brunswick, NJ (US); Michael Andreas Staudenmaier, Munich (DE); Maik Brett, Taufkirchen (DE)

(73) Assignee: NXP B.V., Eindhoven (NL)

( * ) Notice: Subject to any disclaimer, the term of this patent is extended or adjusted under 35 U.S.C. 154(b) by 59 days.

(21) Appl. No.: 17/329,470

(22) Filed: May 25, 2021

(65) Prior Publication Data

US 2022/0390555 A1    Dec. 8, 2022

(51) Int. Cl.
| | | |
|---|---|---|
| *G01S 7/35* | (2006.01) | |
| *G01S 7/41* | (2006.01) | |
| *G01S 13/34* | (2006.01) | |
| *G01S 13/50* | (2006.01) | |

(52) U.S. Cl.
CPC ............... *G01S 7/356* (2021.05); *G01S 7/411* (2013.01); *G01S 13/347* (2013.01); *G01S 13/505* (2013.01)

(58) Field of Classification Search
CPC ........ G01S 7/356; G01S 7/411; G01S 13/347; G01S 13/505
See application file for complete search history.

(56) References Cited

U.S. PATENT DOCUMENTS

| | | | | |
|---|---|---|---|---|
| 10,855,328 | B1 * | 12/2020 | Gulati | G01S 7/0234 |
| 11,215,692 | B2 * | 1/2022 | Itkin | G01S 13/931 |
| 2007/0089015 | A1 * | 4/2007 | Saul | H04L 27/2624 |
| | | | | 714/746 |
| 2017/0010344 | A1 * | 1/2017 | Corbett | G01S 7/023 |
| 2017/0146645 | A1 * | 5/2017 | Kim | G01S 13/347 |
| 2017/0288710 | A1 * | 10/2017 | Delfeld | H04L 25/03343 |
| 2020/0083938 | A1 * | 3/2020 | Park | H04B 7/0617 |
| 2020/0191939 | A1 * | 6/2020 | Wu | G01S 7/354 |
| 2020/0217951 | A1 * | 7/2020 | Park | G01S 13/343 |

(Continued)

FOREIGN PATENT DOCUMENTS

| | | |
|---|---|---|
| CN | 102323575 B | 4/2013 |
| CN | 103308900 B | 10/2014 |

(Continued)

OTHER PUBLICATIONS

Daniel Thomas. "Advanced Processing Techniques." SRC, Inc. 2018 IEEE Radar Conference Tutorial, 114 pgs.

(Continued)

*Primary Examiner* — Erin F Heard
*Assistant Examiner* — Kenneth W Good

(57) ABSTRACT

Aspects of the disclosure are directed to apparatuses, systems and methods for radar processing. As may be implemented in accordance with one or more aspects herein, an apparatus may include receiver circuitry to receive and sample radar signals reflected from a target, and processing circuitry to carry out the following. Representations of the reflections are transformed into the time-frequency domain where they are oversampled. The oversampled representations of the reflections are inversely transformed to provide resampled reflections. Positional characteristics of the target may then be ascertained by constructing a range response characterizing the target based on the resampled reflections.

12 Claims, 4 Drawing Sheets

(56) References Cited

U.S. PATENT DOCUMENTS

| | | | |
|---|---|---|---|
| 2020/0320731 A1* | 10/2020 | Sheen | G01S 13/34 |
| 2021/0156982 A1* | 5/2021 | Stettiner | G01S 13/347 |
| 2021/0364599 A1* | 11/2021 | Roger | G01S 7/356 |
| 2021/0364616 A1* | 11/2021 | Wang | G01S 13/343 |

FOREIGN PATENT DOCUMENTS

| | | |
|---|---|---|
| CN | 104062640 B | 3/2016 |
| EP | 2743727 A3 | 8/2014 |

OTHER PUBLICATIONS

Mark A. Richards. "The Keystone Transformation for Correcting Range Migration in Range-Doppler Processing," pp. 1-29 (Mar. 2014).

P. K. Sanyal, D. M. Zasada, R. P. Perry. "Detecting Moving Targets in SAR via Keystoning and Multiple Phase Center Interferometry," 2006 IEEE Conference on Radar, 6 pgs (Apr. 24-27, 2006).

R. P. Perry, R. C. DiPietro, R. L. Fante. "Coherent Integration With Range Migration Using Keystone Formatting," 2007 IEEE Radar Conference, 6 pgs. (Apr. 17-20, 2007).

Philip van Dorp. "LFMCW based MIMO imaging processing with keystone transform," Proceedings of the 10th European Radar Conference, pp. 467-470 (Oct. 2013).

Faruk Uysal. "Comparison of range migration correction algorithm for range-Doppler processing," Journal of Applied Remote Sensing 11(3), pp. 036023-1-036023-10 (Jul.-Sep. 2017).

Stephanie Bidon et al, Fast Coherent Integration for Migrating Targets with Velocity Ambiguity, IEEE 2011, Department Electronics Optronics and Signal University of Toulouse, France, Radar Electromagnetism Department, ONERA, France.

* cited by examiner

RADAR COMMUNICATIONS WITH OVERSAMPLING

OVERVIEW

Aspects of various embodiments are directed to oversampling representations of radar signal reflections from a target, and related ascertaining of positional characteristics of the target.

A variety of radar communications may be utilized for many different applications. For instance, radar communications may utilize linear frequency modulation (LFM) for high range resolution, which may be useful in relatively high-speed driving environments. High relative speed between a target and an operating radar may result in a range peak response that straddles across more than one range cell, for instance in the life of a chirp sequence. This issue, which may be referred to as range migration, may undermine subsequent Doppler coherent integration and angle estimation processes. This issue may worsen when the size of a range resolution cell is further decreased in high range resolution systems.

These and other matters have presented challenges to radar implementations, for a variety of applications.

SUMMARY

Various example embodiments are directed to issues such as those addressed above and/or others which may become apparent from the following disclosure concerning radar signal processing and related determination of positional characteristics of a target or targets.

In certain example embodiments, aspects of the present disclosure involve transforming radar signal samples, oversampling the samples, and inversely transforming the samples (including the oversampled versions). The resulting samples, of greater number than the original radar signal samples, may then be utilized for a variety of radar processing functions.

In a more specific example embodiment, an apparatus includes receiver circuitry to receive and sample radar signals reflected from a target, and processing circuitry. The processing circuitry is configured to transform representations of the reflections into the time-frequency domain and to oversample the transformed representations of the reflections in the time-frequency domain. The processing circuitry is also configured to inversely transform the oversampled representations of the reflections and, in response, provide resampled reflections. The processing circuitry further ascertains positional characteristics of the target by constructing a range response characterizing the target based on the resampled reflections. As may be implemented herewith, the two-dimensional time-frequency domain may refer to analog-to-digital converter (ADC) sampling in the (fast-time) time dimension, and a chirp sequence (slow-time) spectrum's frequency dimension.

Another aspect of the disclosure is directed to a method as follows. Reflections of transmitted radar signals as received from a target are sampled, and the sampled reflections are processed as follows. Representations of the reflections are transformed into the time-frequency domain and the transformed representations of the reflections are oversampled in the time-frequency domain. The oversampled representations of the reflections are inversely transformed and, in response, resampled reflections are provided. Positional characteristics of the target may then be ascertained by constructing a range response characterizing the target based on the resampled reflections.

The above discussion/summary is not intended to describe each embodiment or every implementation of the present disclosure. The figures and detailed description that follow also exemplify various embodiments.

BRIEF DESCRIPTION OF THE FIGURES

Various example embodiments may be more completely understood in consideration of the following detailed description in connection with the accompanying drawings, in which.

Figure 1:
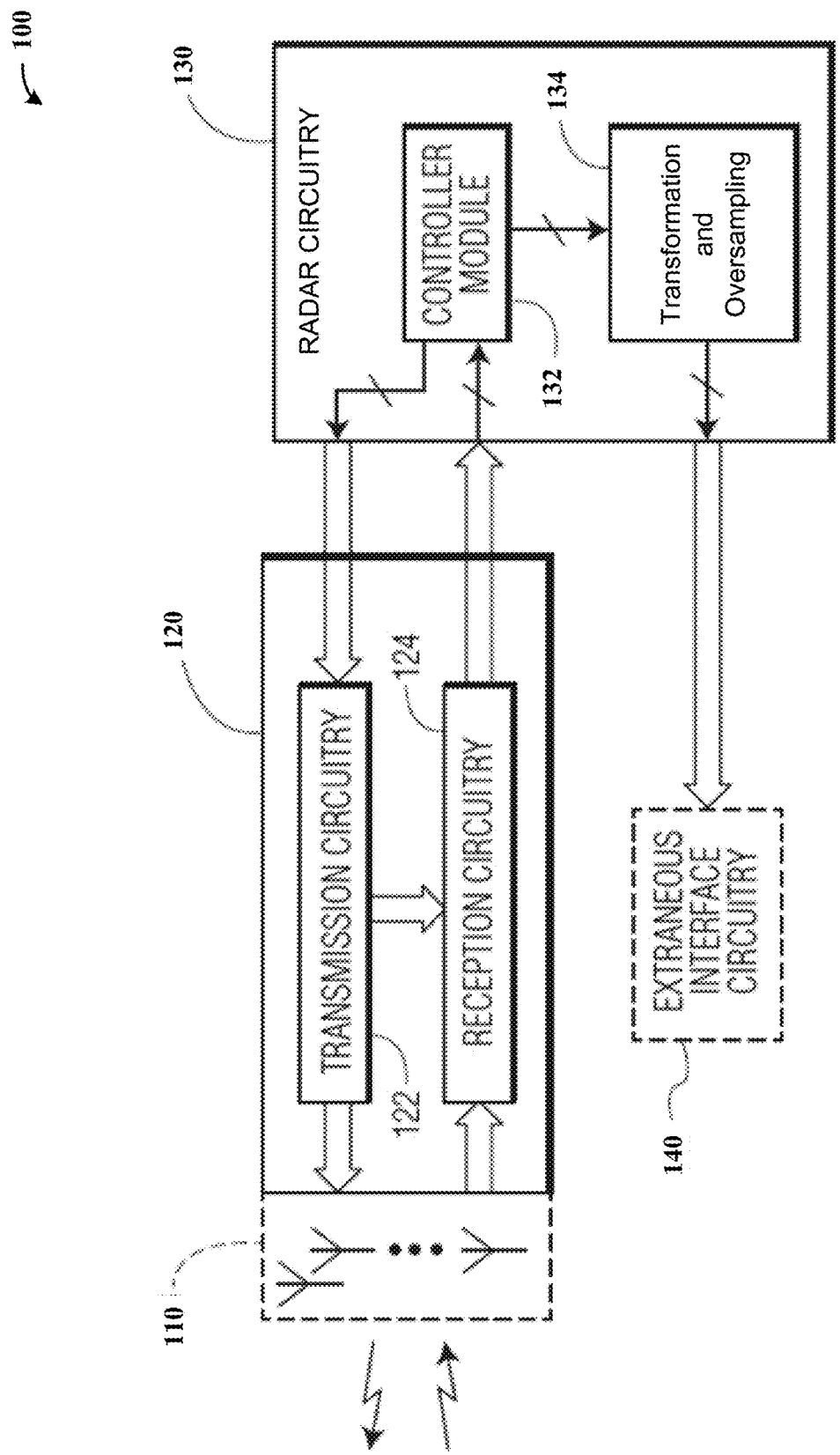
FIG. 1 is a system-level diagram illustrating an example radar communications system/apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving oversampling in radar signal processing, and utilizing resulting samples to ascertain positional characteristics of a target. In certain implementations, aspects of the present disclosure have been shown to be beneficial when used in the context of automotive radar environments, such as those in which respective vehicles may be moving at relatively high speed. In some embodiments, received radar signals are transformed into the time-frequency domain and oversampled, and then inversely transformed to provide resampled reflections that can be used for ascertaining position. In a more particular embodiment, an LFM automotive radar apparatus utilizes a streamlined efficient implementation of a Keystone Transform (KST), which operates directly on samples from an ADC. Slow-time interpolation may be carried out efficiently and accurately using an oversampled inverse Fourier transform. Such approaches may be implemented with scenarios in which the relative speed of a target exceeds an unambiguous radial velocity observable by the apparatus. Such approaches may also be useful to mitigate noise, for example, where a moving target migrates out of a range cell and straddles more than one range cell over a chirp sequence. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given herein. In other instances, well known features may have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments are directed to automotive radar systems and their implementation, utilizing LFM pulse-Doppler radar waveforms. Range-matched filtering may be carried out by analog deramp mixing followed by analog to digital conversion, and a range response may computed in the digital domain using fast Fourier transform (FFT) (e.g., via a hardware accelerator). An analog chirp mixer (or deramp mixer) may be used to convert a linear chirp echo into sinusoidal tones that can be sampled with a much slower ADC. A direct slow-time resampling may be carried out on the ADC samples followed by a range FFT. For instance, spectra may be sampled in slow-time sampling grids, oversampled to provide additional samples, and processed using an inverse fast Fourier transform (IFFT) into the range response domain. Range migration effects may be removed.

Oversampling may be carried out in a variety of manners. An input sample vector of length N may be converted into the spectral domain by using a FFT. An oversample IFFT may be performed by computing s branches of length-N complex-weighted IFFTs. The outputs of the IFFT bank may be useful in interleaved memory locations. The nearest samples to the interpolation grid may be selected and arranged into an output sample vector. The nearest-sample indices may be fixed, predetermined and stored in a memory, and may not need to be computed in runtime. The following depicts an approach to oversampling, as may be implemented in accordance with one or more embodiments.

The expression s=K/N may be provided as an integer interpolation factor corresponding to an oversampled inverse discrete Fourier transform (IDFT) operation, which can be written as follows in which X may be periodic every N samples:

$$y_k = \sum_{n=0}^{sN-1} Y_n e^{j\frac{2\pi}{K}nk}$$

where $$Y_n = \begin{cases} X_n, & n = 0, 1, 2, \ldots \frac{N}{2} - 1 \\ 0, & n = \frac{N}{2}, \frac{N}{2}+1, \ldots, sN - \frac{N}{2} - 1 \\ X_n, & n = sN - \frac{N}{2}, sN - \frac{N}{2}+1, \ldots, sN - 1 \end{cases}$$

is the spectrum of y, an interpolated version of x by a factor of s, where X is the spectrum of x. The expression Y may be a zero-padded version of X where the zeros are padded around the angular frequency π. The expressions x and X are N-sample vectors and y and Y are K-sample vectors, related by x=IDFT(X), X=DFT(x), y=IDFT(Y), Y=DFT(y), where DFT denotes discrete Fourier transform.

In one embodiment of the present invention an efficient controlled IFFT process is used instead of the above zero-padded IDFT or IFFT up-sampling process, in which s branches of constant-μ controlled length-Ne IFFT are performed on the spectral domain sample vector X, and the controlled IFFT outputs are combined into an up-sampled vector y. The following paragraphs may be implemented in this regard. Utilizing the zero portion of $Y_k$, the IDFT of $Y_k$ can be rewritten as the following.

$$y_k = \sum_{n=0}^{\frac{N}{2}-1} X_n e^{j\frac{2\pi}{K}nk} + \sum_{n=sN-\frac{N}{2}}^{sN-1} X_n e^{j\frac{2\pi}{K}nk} =$$

$$\sum_{n=0}^{\frac{N}{2}-1} X_n e^{j\frac{2\pi}{sN}nk} + \sum_{n=\frac{N}{2}}^{N-1} X_{n+(s-1)N} e^{j\frac{2\pi}{sN}(n+(s-1)N)k}$$

Since X is periodic every N samples, $$X_{n+(s-1)N} = X_n, \text{ and}$$

$$y_k = \sum_{n=0}^{\frac{N}{2}-1} X_n e^{j\frac{2\pi}{sN}nk} + \sum_{n=\frac{N}{2}}^{N-1} X_n e^{j\frac{2\pi}{sN}(n+(s-1)N)k} =$$

$$\sum_{n=0}^{\frac{N}{2}-1} X_n e^{j\frac{2\pi}{sN}nk} + \sum_{n=\frac{N}{2}}^{N-1} e^{j\frac{2\pi}{s}(s-1)k} X_n e^{j\frac{2\pi}{sN}nk} =$$

$$\sum_{n=0}^{N-1} b_{n,k} X_n e^{j\frac{2\pi}{sN}nk} = \sum_{n=0}^{N-1} b_{n,k} X_n e^{j\frac{2\pi}{N}n\frac{k}{s}}$$

where $b_{n,k} = \begin{cases} 1, & \text{for } n = 0, 1, 2, \ldots \frac{N}{2} - 1 \\ e^{j\frac{2\pi}{s}(s-1)k}, & \text{for } n = \frac{N}{2}, \frac{N}{2}+1, \ldots, N-1 \end{cases}$.

The expression can be simplified by grouping the index k (k∈ {0, 1, 2, . . . , sN−1}) into s groups based on the remainder of k divided with s. Letting $k_\mu$ to be the subset of k where rem(k, s)=μ, the groups are:

$$k_\mu = \begin{cases} 0, s, 2s, 3s, \ldots, & \text{if } \mu = 0 \\ 1, s+1, 2s+1, 3s+1, \ldots, & \text{if } \mu = 1 \\ 2, s+2, 2s+2, 3s+2, \ldots, & \text{if } \mu = 2 \\ \vdots \\ s-1, 2s-1, 3s-1, 4s-1, \ldots, & \text{if } \mu = s-1 \end{cases}$$

Rewriting $y_k$ with μ provides the following, $$y_k = \sum_{n=0}^{N-1} b_{n,k} e^{j\frac{2\pi}{N}n\frac{\mu}{s}} X_n e^{j\frac{2\pi}{N}n\frac{k_\mu-\mu}{s}}$$

such that for each µ index group, the expression can be written as $$y_{k|rem(n,s)=\mu} = \sum_{n=0}^{N-1} b_{n,k} e^{j\frac{2\pi}{N}n\frac{\mu}{s}} X_n e^{j\frac{2\pi}{N}n\frac{k\mu-\mu}{s}} = \sum_{n=0}^{N-1} \left\{ b_{n,k} e^{j\frac{2\pi}{N}n\frac{\mu}{s}} \right\} X_n e^{j\frac{2\pi}{N}n\frac{k\mu-\mu}{s}} = y_{k_\mu}$$

For the expression $$w_{n,n_\mu} = b_{n,k} e^{j\frac{2\pi}{N}n\frac{\mu}{s}}, y_{k_\mu}$$

can be written as $$y_{k_\mu} = \sum_{n=0}^{N-1} w_{n,n_\mu} X_n e^{j\frac{2\pi}{N}n\frac{k\mu-\mu}{s}} = IDFT\{wX\}$$

which has a form of weighted IDFT and can be implemented using N-point IFFT efficiently.

The interpolated y can be obtained by performing s realizations of N-point IFFTs to obtain $y_{n_0}, y_{n_1}, \ldots y_{n_{s-1}}$ and combining the output based on the following mapping.

$$\begin{bmatrix} y_{k_0}(0) & y_{k_1}(0) & & y_{k_{s-1}}(0) \\ y_{k_0}(1) & y_{k_1}(1) & & y_{k_{s-1}}(1) \\ \vdots & \vdots & \ldots & \vdots \\ y_{k_0}(N-1) & y_{k_1}(N-1) & & y_{k_{s-1}}(N-1) \end{bmatrix} =$$

$$\begin{bmatrix} y_0 & y_1 & \cdots & y_{s-1} \\ y_s & y_{s+1} & \cdots & y_{2s-1} \\ \vdots & \vdots & & \vdots \\ y_{(N-1)s} & y_{(N-1)s+1} & \cdots & y_{K-1} \end{bmatrix}$$

For simplicity, the tapering window weight is omitted from above formulation. The windowing weights can be multiplied to the complex weight if needed.

Various embodiments are directed to applications in which a target's radial velocity may exceed an unambiguous radial velocity bounds of a particular radar system. Steps may be taken to compute KST under multiple integer-$2\pi$ ambiguity hypotheses and to detect the correct hypothesis and select the result accordingly. Due to target motion, range peak may migrate over the slow time across each chirp such that the phase of the range peak may no longer be constant and may progressively shift across each chirp. A modified KST may be carried out with respect to a known number of aliasing, $N_{amb}$, to compensate for Nyquist wrapping. An $N_{amb}$ of 0 means there is no ambiguity; an $N_{amb}$ of +1 means the progressive phase change falls within [$\pi$~$3\pi$); an $N_{amb}$ of +2 means the progressive phase change falls within [$3\pi$~$5\pi$); and an $N_{amb}$ of −1 means the progressive phase change falls within [$-2\pi$~$-\pi$) . . . etc. The modified KST output may exhibit the following form (as a function of $N_{amb}$):

$$\tilde{g}_a(t, \tau_k') = \tilde{g}(t, \tau_k') e^{-j2\pi N_{amb}\frac{f_0}{f_0+\frac{B}{T_c}}\tau_k} = g\left(t, \frac{f_0 \tau_k}{f_0+\frac{B}{T_c}t}\right) e^{-j2\pi N_{amb}\frac{f_0}{f_0+\frac{B}{T_c}}\tau_k}$$

Since $N_{amb}$ is unknown, multiple hypothesis of $N_{amb}$= . . . −2, −1, 0, 1, 2, . . . may be tested until the range-Doppler is focused or until it exceeds the range for testing. By detecting focus versus defocus or by checking SNR, one may discern which hypothesis is working for a target and then proceed the next phase of processing.

A variety of embodiments are directed to apparatuses having receiver circuitry for receiving and sampling radar signals reflected from a target, and processing circuitry for carrying out radar signal processing. Specifically, representations of the reflections may be transformed into a time-frequency domain and oversampled therein. The oversampled representations of the reflections are then inversely transformed to provide resampled reflections. For instance, the processing circuitry may operate to transform the representations of the reflections using a fast time Fourier transform (FFT) and to inversely transform the oversampled transformed representations using an inverse FFT (IFFT). Positional characteristics of the target may be ascertained by constructing a range response characterizing the target, based on the resampled reflections. For instance, a range response with range migration removed may be achieved by computing a fast-time FFT of the resampled reflections.

The processing circuitry may operate in a variety of manners. For instance, the processing circuitry may construct a slow-time sample vector for respective fast-time sample positions, convert each slow-time sample vector to a spectral domain sample vector via FFT, and perform controlled IFFTs on the spectral domain sample vectors. The IFFT outputs may be combined into an up-sampled vector and used to compute an interpolation output. For instance, up-sampled vector components may be selected, relative to desired interpolation processing slow-time positions, and used to construct the range response. The processing circuitry may perform range-FFT processing in a fast-time dimension for chirps in the reflections, and perform Doppler-FFT processing in a slow-time dimension, with resampled slow-time sample vectors of the resampled reflections. In a more specific embodiment, the processing circuitry converts an input sample vector of length N (corresponding to the representations) into a spectral domain by using a FFT, and oversamples the transformed representations of the reflections by computing branches of length-N complex-weighted IFFTs. Ones of the oversampled representations that are nearest to a predefined index, relative to other ones of the oversampled representations, may be selected and arranged into an output sample vector.

The processing circuitry may include interpolation circuitry to interpolate the transformed representations of the reflections to provide the transformed representations of the reflections. The apparatus may further include data processing circuitry to ascertain, in response to the interpolation circuitry, the positional characteristics of the target. Interpolation may be carried out in a variety of manners. In some implementations, a hardware accelerated interpolator is used in a manner that may correspond to circular sinc interpolation, including zero-padding in the spectral domain and transforming the zero-padded spectrum back to the (slow) time domain using an inverse Fourier transform. The nearest sample to desired grid points may then be selected. With a sufficiently high oversampling factor, the residual quantization error can be neglected. Spectrum zero padding may be applied at the $\pi$-radian frequency point. The oversampled IFFT processes may be carried out by concatenating multiple weighted length-N IFFT outputs. The number of IFFTs may equal the oversampling factor. For an oversampling factor s=K/N the output of the IFFT may be of length K. The computation may exhibit an order of complexity of O{sN log(N)} with the maximum length of IFFT fixated at N (e.g., and does not grow with s).

An apparatus as noted above may further include transmission circuitry to transmit the radar signals that include chirps, with the receiver circuitry having an ADC that samples the reflections. The receiver circuitry may thus receive reflections of each chirp and sample the chips by generating target beat signals. This may include performing amplification, de-ramp mixing via the radar signals transmitted by the transmission circuitry, and filtering of the received chirps. The processing circuitry may generate range-Doppler maps via the range response, and conduct subsequent radar signal processing via the range-Doppler maps to ascertain the positional characteristics of the target.

Other aspects of the disclosure are directed to methods, which may be implemented in accordance with a variety of approaches including those characterized with the various apparatuses discussed herein. For instance, reflections of transmitted radar signals, as received from a target, are sampled and representations thereof are transformed into the time-frequency domain. The transformed representations are oversampled in the time-frequency domain and these oversampled representations are subsequently inversely transformed to provide resampled reflections. Positional characteristics of the target may then be ascertained by constructing a range response characterizing the target based on the resampled reflections, for instance in a manner as may otherwise be utilized on the initially sampled reflections, and with increased accuracy provided by the oversamples. The transformed representations may be interpolated to provide the transformed representations of the reflections, and the interpolated representations may be utilized to ascertain the positional characteristics. Transforming the representations of the reflections may include performing range-FFT processing in a fast-time dimension for chirps in the reflections, with Doppler-FFT processing further carried out in a slow-time dimension using resampled slow-time sample vectors of the resampled reflections. The representations may be transformed using an FFT and the oversampled representations may be inversely transformed using an IFFT. Range migration may be removed by computing a fast-time FFT of the resampled reflections.

In a particular implementation, a slow-time sample vector is provided for respective fast-time sample positions and each slow-time sample vector is converted to a spectral domain sample vector via FFT. Controlled IFFTs may be performed on the spectral domain sample vectors. IFFT outputs may be combined into an up-sampled vector and used to compute an interpolation output, in which up-sampled vector components are selected relative to desired interpolation processing slow-time positions.

The radar signals may be transmitted as chirps that are sampled by an ADC to generate target beat signals that are amplified and de-ramped using the transmitted chirps, followed by filtering. Range-Doppler maps may be generated via the range response, with the positional characteristics being ascertained by conducting subsequent radar signal processing via the range-Doppler maps.

Turning now to the figures, FIG. 1 shows a radar apparatus 100, as may be implemented in accordance with one or more embodiments. The apparatus 100 includes an antenna array 110, radar communication circuitry 120, and radar processing circuitry 130 (which may further interface with interface circuitry 140, for example automotive interface circuitry). The antenna array 110 includes a plurality of antennas, and the radar communication circuitry 120 includes transmission circuitry 122 and reception circuitry 124 (e.g., a plurality of transmitters and receivers). The radar processing circuitry 130 (e.g., radar MCPU) includes a controller module 132, as well as transformation and oversampling circuitry 134.

These components of apparatus 100 are operable to provide radar communications, in connection with signals communicated with the radar processing circuitry 130, utilizing time-frequency domain oversampling, and as may be implemented in accordance with one or more embodiments herein. For instance, positional characteristics of a target from which radar signals transmitted by the transmission circuitry 122 via the antenna array 110, and which are reflected from the target and received by the reception circuitry via the antenna array, may be ascertained by oversampling received signals and using the oversampled signals to improve accuracy in position determination. Oversampling may involve, for example, adding one or more samples (in time) between actual samples of a radar signal. This may involve utilizing a transform such as a FFT upon a set of radar signal samples, adding the additional samples (in the transformed domain) between each transformed sample in the set of radar signal samples, and then inversely transforming all of the samples (those pertaining to the actual sample and to the added samples). These inversely transformed samples can then be utilized to provide higher resolution relative to the originally-sampled radar signals, and processed accordingly to provide accurate positional information. In certain embodiments, the transmission circuitry 122 and reception circuitry 124 are respectively implemented in accordance with the transmitter and receiver circuitry as characterized in communication circuitry 220 in FIG. 2.

Figure 2:
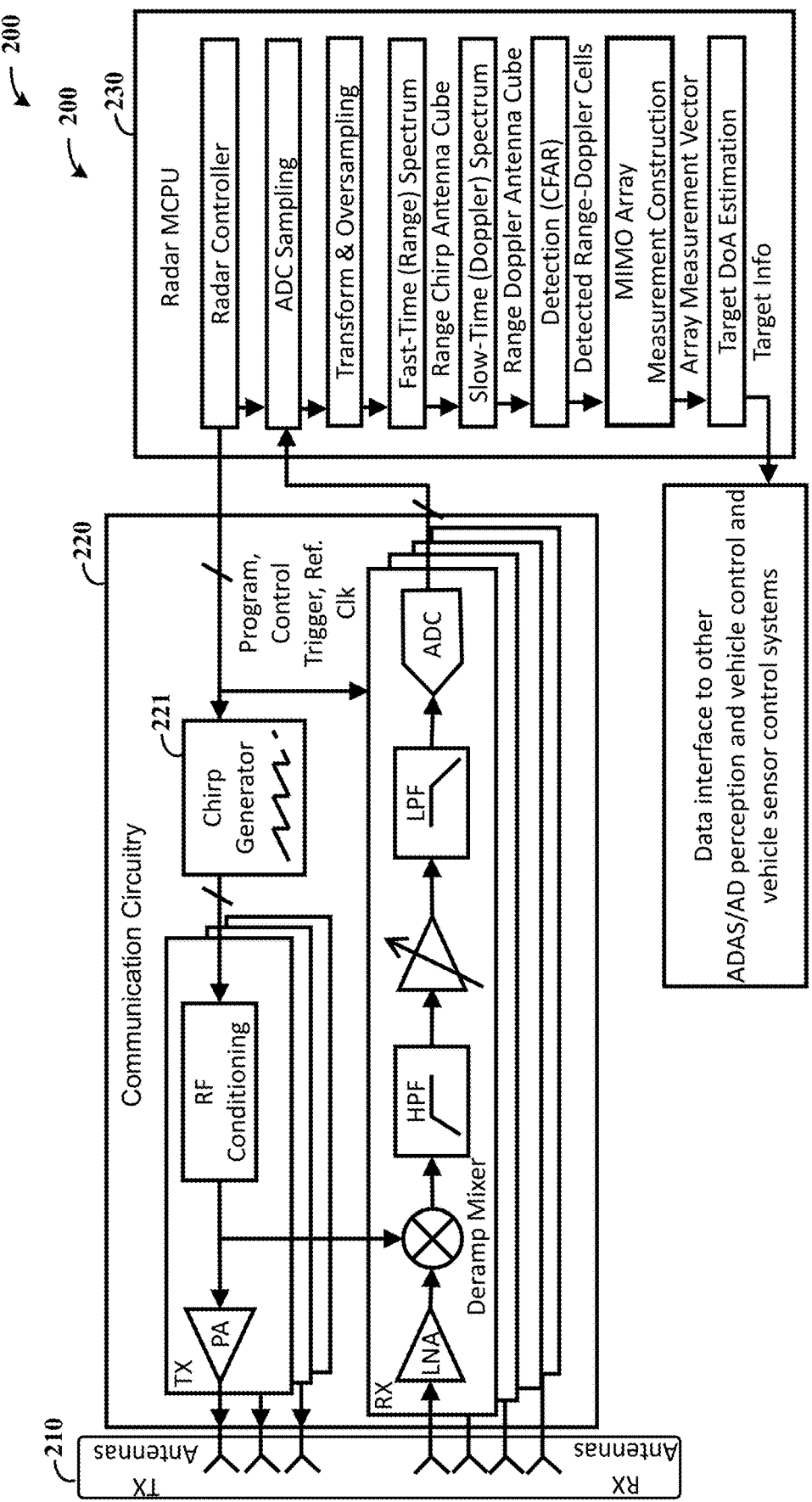
FIG. 2 shows notional a radar apparatus operable for oversampling-based phase compensation, in accordance with the present disclosure.

FIG. 2 shows notional multi-input, multi-output (MIMO) linear-chirp FMCW radar apparatus 200 with oversampling, as may be utilized for example in accordance with one or more embodiments. The apparatus 200 includes an antenna array 210, communication circuitry 220 and radar processing circuitry 230. The communication circuitry 220 includes a plurality of transmitters and receivers (e.g., three transmitters and four receivers). The transmitters may include a chirp generator 221 operable to generate respective chirps, and may include other transmission circuitry such as conditioning and amplifier circuits, and operate in response to radar control circuitry within the radar processing circuitry 230.

The receivers may include amplifier, filters and other circuits as useful for receiving radar signals. For instance, each receiver may mix a return radar reflection with a transmitted chirp and filter the result to generate deramped IF (intermediate frequency) signals to be sampled by analog-to-digital converters (ADCs) and processed by a digital signal processing (DSP) unit to produce range and Doppler responses for each receive channel. The range-Doppler response maps of the receivers from the transmitted signals may be aggregated to form a complete MIMO array measurement data cube of range-Doppler response maps of antenna elements of a constructed MIMO virtual array. The range-Doppler responses may be non-coherently integrated and target detection may be attempted on the energy-combined range-Doppler map. A detection algorithm, such as may relate to variants of a CFAR algorithm, may be used to identify the range-Doppler cells in which targets may be present. For each detection cell, the array measurement vector may then be extracted and processed for identifying the incident angles of any target returns contained in the cell.

Reflected radar signals received via the antenna array 210 and communication circuitry 220 are passed to the radar processing circuitry 230. The received signals are processed accordingly by transforming samples of the signals into the time-frequency domain, oversampling the transformed samples, and inversely transforming the oversampled transformed samples. The output of this process may thus provide additional oversampled data that can be utilized for improving radar accuracy. The radar processing circuitry 230 may further carry out angle estimation and target tracking, using output array vectors, for tracking positional characteristics of targets from which reflections are received. Such target information may further be provided via a data interface to external systems, such as automotive systems.

Figure 3:
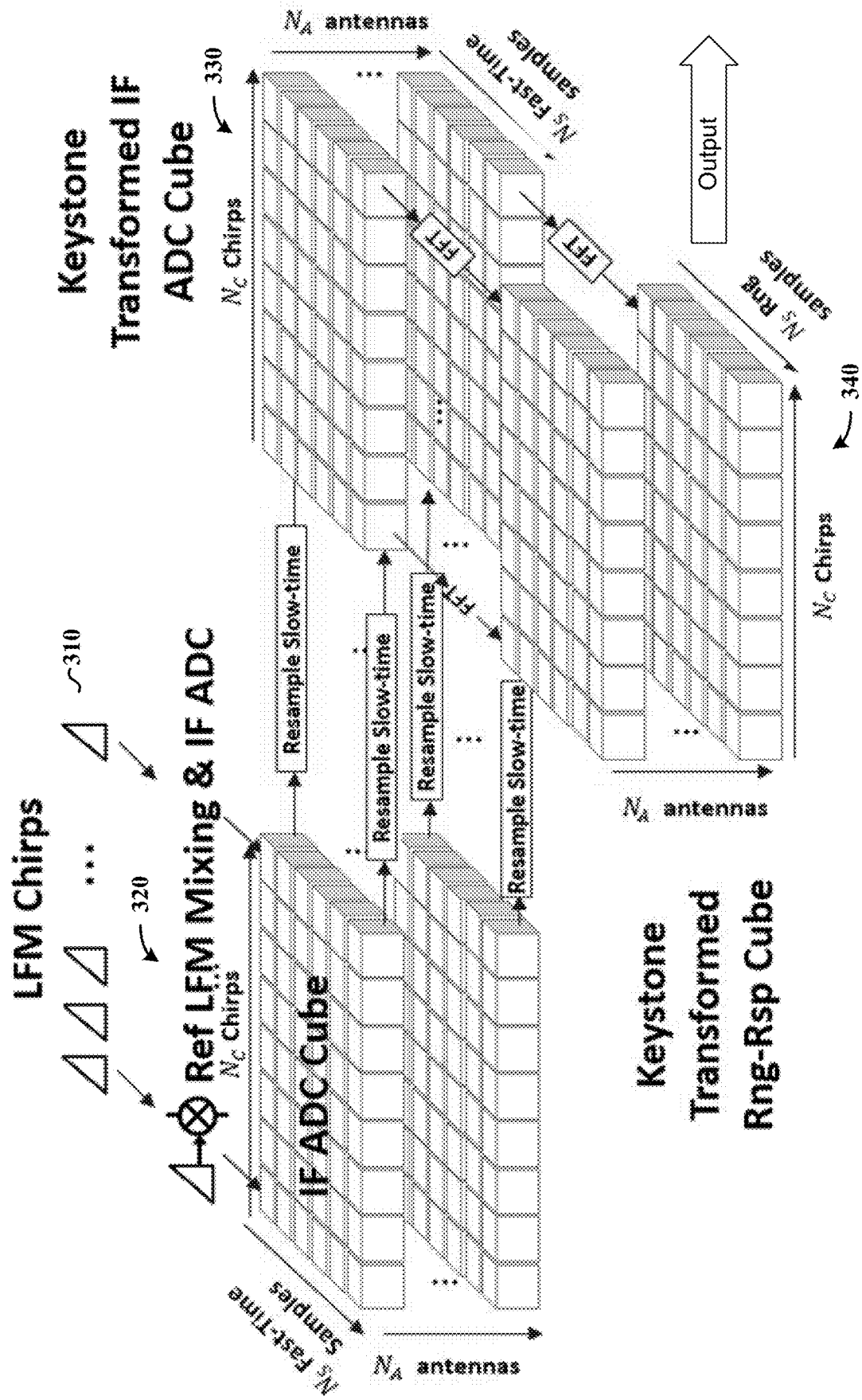
FIG. 3 shows a transformation and resampling process, in accordance with the present disclosure.

FIG. 3 shows a transformation and resampling process, in accordance with the present disclosure. A series of LFM chirps 310 are sampled to create intermediate frequency (IF) ADC cubes 320 of $N_s$ fast-time samples for respective antennas. The samples are resampled in slow time to provide Keystone-transformed IF ADC cubes 330. Resampling in slow time may involve resampling slow-time vectors with respect to each fast-time t as follows:

$$\tau_k = \frac{f_0}{f_0 + \frac{B}{T_c}t}\tau'_k$$

$$t = [0, 1, 2, \ldots, N_s - 2, N_s - 1]T_s$$

wherein the $\tau_k$ vector has fixed intervals of PRI. Any of the $\tau_k$ may be set to be slow time 0. An FFT can then be carried out to provide Keystone-transformed range response cubes 340, which can then be output and used for various radar processing tasks.

Resampling may be carried out in a variety of manners. In some instances, a sequence of chirps are transmitted upon a frame trigger, and target beat signals are generated from reflections of the chirps by performing amplification, deramp mixing, and filtering. The target beat signals are sampled using ADCs, and slow-time resampling is carried out for each ADC sample position (e.g., as may be implemented with the approach shown in FIG. 4 and discussed below). Range-FFT processing is carried out in the fast-time dimension for every chirp, and Doppler-FFT processing is carried out in the slow-time dimension with a resampled slow-time sample vector. Range-Doppler maps are generated and subsequent radar signal processing tasks (e.g., detection, angle estimation, clustering, tracking, classification, and fusion) may then be carried out.

Figure 4:
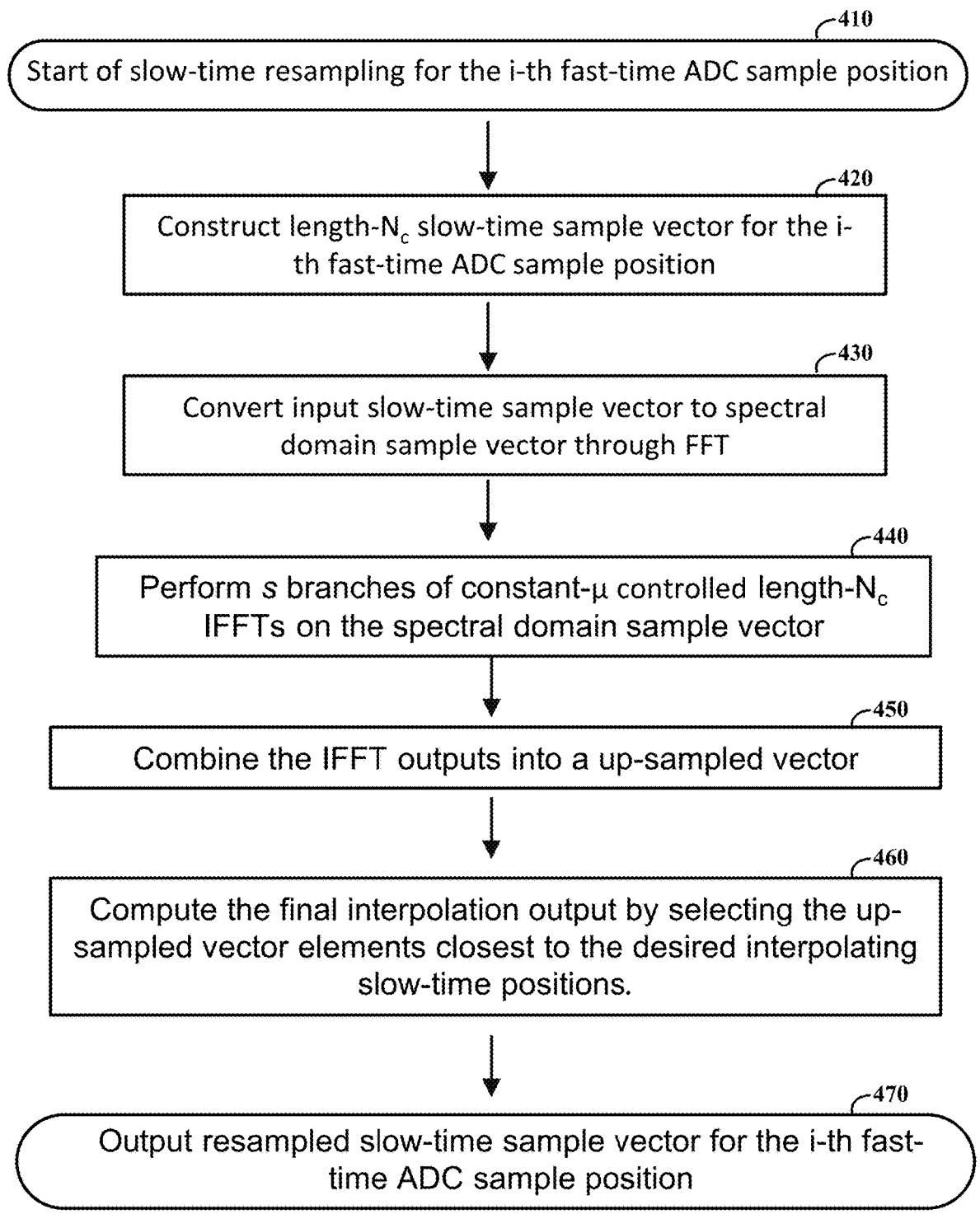
FIG. 4 is a flow diagram for slow-time resampling, in accordance with the present disclosure.

FIG. 4 is a flow diagram for a specific approach to slow-time resampling, in accordance with the present disclosure. At block 410, slow-time resampling is initiated for an i-th fast-time ADC sample position. A length-N slow-time sample vector is constructed for the i-th fast-time ADC sample position at block 420, and the sample vector is converted to the spectral domain through FFT at block 430. At block 440, s branches of constant-µ controlled length-$N_c$ IFFTs are performed on the spectral domain sample vector, and the controlled IFFT outputs are combined into an up-sampled vector at block 450. An interpolation output is computed at block 460 by selecting elements of the up-sampled vector closest to desired interpolation or resampling processing slow-time positions. A resampled slow-time sample vector is then output at block 470, for the i-th fast-time ADC sample position.

Referring again to FIG. 3, radar processing and resampling may be carried out in accordance with the following. The expression $g_{n,k}(t)$ is denoted as the deramp mixer output of an n-th receiver for a k-th chirp, where $1 \leq k \leq N_c$ and $N_c$ is the number of chirps, and t is denoted as the fast-time time variable with each chirp starts at t=0 (and t=$t_1, t_2, \ldots t_{N_s}$=[0, 1, 2, \ldots, $N_s-2, N_s-1]T_s$, where $N_s$ is the number ADC samples acquired per chirp and $T_s$ is the sampling interval). Assuming there are L targets, $g_{n,k}(t)$ can be modelled in the following equation where $\alpha_i$ is the amplitude of the i-th target; $f_0$ is the chirp starting frequency; B is the chirp bandwidth; $T_c$ is the chirp transmission duration; $r_{T,i}$ is the departing range from the transmitter to the i-th target; and $r_{n,i}$ is the arriving range from the i-th target back to the n-th receiver.

$$g_{n,k}(t) = \sum_{i=1}^{L} \alpha_i e^{j2\pi\left(f_0\frac{(r_{T,i}(t)+r_{n,i}(t))}{C} + \frac{B}{T_c}\frac{(r_{T,i}(t)+r_{n,i}(t))}{C}t - \frac{B}{2T_c}\left(\frac{(r_{T,i}(t)+r_{n,i}(t))}{C}\right)^2\right)} \cong$$

$$\sum_{i=1}^{L} \alpha_i e^{j2\pi\left(f_0\frac{(r_{T,i}(t)+r_{n,i}(t))}{C} + \frac{B}{T_c}\frac{(r_{T,i}(t)+r_{n,i}(t))}{C}t\right)}$$

For certain automotive radar use cases, the relative radial motion of the target can be approximated using a linear radial motion model. The expression τ may be denoted as the slow-time time variable whose value changes at chirp starts to the absolute chirp starting time and remains constant until next chirp start (e.g., $\tau=(k-1)*T_{PRI}$ for $(k-1)*T_{PRI} \leq t < k*T_{PRI}$, where $T_{PRI}$ is the time interval between two adjacent chirps). The round-trip range function (e.g., sum of $r_{T,i}$ and $r_{n,i}$) can be written in the following simpler format where $\dot{r}_{Ti}$ and $\dot{r}_{ni}$ indicate the range rates.

$$r_{T,i}(t)+r_{n,i}(t) \cong r_{Ti}+\dot{r}_{Ti}\tau+r_{ni}+\dot{r}_{ni}\tau$$

Applying a linear radial motion approximation, the mixer output can be written as the following equation.

$$g_{n,k}(t, \tau) \cong \sum_{i=1}^{L} \alpha_i e^{j2\pi\left(f_0\frac{r_{Ti}+\dot{r}_{Ti}\tau+r_{ni}+\dot{r}_{ni}\tau}{C} + \frac{B}{T_c}\frac{r_{Ti}+\dot{r}_{Ti}\tau+r_{ni}+\dot{r}_{ni}\tau}{C}t\right)} =$$

$$\sum_{i=1}^{L} \alpha_i e^{j\frac{2\pi}{c}(f_0(r_{Ti}+r_{ni}+(\dot{r}_{Ti}+\dot{r}_{ni})\tau))} e^{j2\pi\left(\frac{B(r_{Ti}+r_{ni}+(\dot{r}_{Ti}+\dot{r}_{ni})\tau)}{CT_c}\right)t}$$

By observing the above function, the fast-time target signal follows a complex sinusoidal function with frequency varying from chirp to chirp as a function of the range rate of the target. Obviously, if the $(\dot{r}_{Ti}+\dot{r}_{ni})\tau$ term is not negligible (comparing to range resolution) range migration occurs.

Given the above mixer output signal model, a transform (e.g., KST) method as carried out herein may be utilized to eliminate slow-time frequency variation components by performing a change of the slow-time variables. A new slow-time time variable τ' may be defined as relating to τ according to the following equation.

$$\tau = \frac{f_0}{f_0 + \frac{B}{T_c}t}\tau'$$

The mixer output signal model may be updated with the change of variable according to the following equation.

$$\tilde{g}_{n,k}(t,\tau') \cong \sum_{i=1}^{L} \alpha_i e^{j\frac{2\pi}{C}\left((f_0+\frac{B}{T_c}t)(r_{Ti}+r_{ni})+(f_0+\frac{B}{T_c}t)(\dot{r}_{Ti}+\dot{r}_{ni})\frac{f_0}{f_0+\frac{B}{T_c}t}\tau'\right)} =$$

$$\sum_{i=1}^{L} \alpha_i e^{j\frac{2\pi}{c}(f_0(r_{Ti}+r_{ni})+(\dot{r}_{Ti}+\dot{r}_{ni})\tau'))} e^{j2\pi\left(\frac{B(r_{Ti}+r_{ni})}{CT_c}\right)t}$$

The mixer output signal model may omit a frequency component that varies with slow time such that range migration is mitigated. This approach may thus involve resampling the slow time for each fast time. The new $\tilde{g}_{n,k}(t,\tau')$ samples are found by interpolating $g_{n,k}(t,\tau)$ onto the new slow-time sampling grid, such as by finding $$\left\{ g\left(\frac{f_0}{f_0+\frac{B}{T_c}t}\tau_1\right), g\left(\frac{f_0}{f_0+\frac{B}{T_c}t}\tau_2\right), \ldots, g\left(\frac{f_0}{f_0+\frac{B}{T_c}t}\tau_{N_c}\right) \right\}$$

based on the input $\{g(\tau_1), g(\tau_2), \ldots, g(\tau_{N_c})\}$. In one instance the resampling is done using interpolation and this new slow-time sampling grid defines the desired interpolation processing slow-time positions upon which the ADC samples across the slow-time (i.e. over all of the chirps) at fast-time ADC sampling position t relative to each chirp start is interpolated.

The assignment of τ's initial value may determine the alignment of the resulting range after KST. For example, to align the KST range to the range value at the center of the chirp sequence, the following assignment should be used:

$$\tau \in [\tau_1, \tau_2, \ldots \tau_k \ldots \tau_{N_c}] = \left[-\frac{N_c}{2}, -\frac{N_c}{2}+1, \ldots 0, \ldots \frac{N_c}{2}-1\right] * T_{PRI};$$

to align the KST range to the range value at the beginning of the chirp sequence, the following assignment may be used: $\tau \in [\tau_1, \tau_2, \ldots \tau_k \ldots \tau_{N_c}]=[0, 1, 2, \ldots, N_c-1]*T_{PRI}$; and to align the KST range to the range value at the end of the chirp sequence, the following assignment may be used: $\tau \in [\tau_1, \tau_2, \ldots \tau_k \ldots \tau_{N_c}]=[-N_c+1, -N_c+2, \ldots, -1, 0]*T_{PRI}$.

As examples, the Specification describes and/or illustrates aspects useful for implementing the claimed disclosure by way of various circuits or circuitry which may be illustrated as or using terms such as blocks, modules, device, system, unit, controller, interface circuitry, MCPU, and/or other circuit-type depictions (e.g., reference numerals 120 and 130 of FIG. 1, and 220 and 230 of FIG. 2 may depict a block/module as described herein). Such circuits or circuitry may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU or MCPU), in one example the logic circuitry may carry out a process or method (sometimes "algorithm") by performing sampling, transformation, oversampling and inverse transformation. In another example, logic circuitry may carry out a process or method by performing these same activities/operations and, various other radar processing steps in addition. Yet another process or method in this context would be recognized in connection with the functions/activities associated with the processes depicted in FIGS. 3 and 4.

For example, in certain of the above-discussed embodiments, one or more modules are discrete logic circuits or programmable logic circuits configured and arranged for implementing these operations/activities, as may be carried out in the approaches shown in FIGS. 3 and 4. In certain embodiments, such a programmable circuit is one or more computer circuits, including memory circuitry for storing and accessing a program to be executed as a set (or sets) of instructions (and/or to be used as configuration data to define how the programmable circuit is to perform). An algorithm or process as described in FIG. 4 and/or otherwise characterized herein for activities such as oversampling, interpolating and/or transforming may be used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, some embodiments are directed to fewer than all steps and/or components, such as to carry out one or more of oversampling, transforming and interpolation. Such modifications do not depart from the true spirit and scope of various aspects of the disclosure, including aspects set forth in the claims.

What is claimed is:
1. An apparatus comprising:
    receiver circuitry to receive and sample radar signal reflections as reflected from a target; and
    processing circuitry to:
        transform representations of the reflections into a fast-time domain, the representations comprising a plurality of length-N sample vectors;
        convert a sample vector of the plurality of length-N sample vectors into a spectral domain by using a fast Fourier transform (FFT);
        oversample the transformed representations of the reflections by computing branches of length-N complex-weighted inverse FFTs (IFFTs);
        select a subset of the oversampled representations that are nearest to a predefined index, relative to other representations of the oversampled representations;
        arrange the subset of the oversampled representations into an output sample vector;
        and
        ascertain positional characteristics of the target by constructing a range response characterizing the target based on at least the output sample vector.
2. The apparatus of claim 1, wherein the processing circuitry includes interpolation circuitry configured to oversample the transformed representations and to select the subset of the oversampled representations that are nearest to the predefined index.
3. The apparatus of claim 1, wherein:
    the processing circuitry is to transform the representations of the reflections using another FFT; and the processing circuitry is to construct the range response with range migration removed by computing at least one fast-time FFT.

4. The apparatus of claim 1, wherein the processing circuitry is to:
perform range-FFT processing in a fast-time dimension for chirps in the reflections; and
perform Doppler-FFT processing in a slow-time dimension, with resampled slow-time sample vectors of the resampled reflections.

5. The apparatus of claim 1,
further including transmission circuitry to transmit the radar signals to include chirps; and
wherein the receiver circuitry includes an analog to digital converter (ADC) to sample the reflections, and the receiver circuitry is to receive reflections of each chirp and to sample the chips by generating target beat signals, including performing amplification, de-ramp mixing via the radar signals transmitted by the transmission circuitry, and filtering of the received chirps.

6. The apparatus of claim 5, wherein the processing circuitry is to:
generate range-Doppler maps via the range response; and
conduct subsequent radar signal processing via the range-Doppler maps to ascertain the positional characteristics of the target.

7. A method comprising:
sampling reflections of transmitted radar signals received from a target; and
processing the sampled reflections by:
transforming representations of the reflections into the time-frequency domain by constructing a slow-time sample vector for respective fast-time sample positions and converting each slow-time sample vector to a spectral domain sample vector via fast Fourier transform (FFT);
oversampling the transformed representations of the reflections in the time-frequency domain;
inversely transforming the oversampled representations of the reflections and, in response, provide resampled reflections by performing controlled inverse FFTs (IFFTs) on the spectral domain sample vectors and providing IFFT outputs therefrom;
combining the IFFT outputs into an up-sampled vector; and
computing an interpolation output by selecting up-sampled vector components relative to desired interpolation processing slow-time positions, wherein constructing the range response includes using the interpolation output; and
ascertaining positional characteristics of the target by constructing a range response characterizing the target based on the resampled reflections.

8. The method of claim 7, wherein:
constructing the range response includes removing range migration by computing a fast-time FFT of the resampled reflections.

9. The method of claim 7, wherein, transforming the representations of the reflections includes performing range-FFT processing in a fast-time dimension for chirps in the reflections, further including performing Doppler-FFT processing in a slow-time dimension with resampled slow-time sample vectors of the resampled reflections.

10. The method of claim 7,
further including transmitting the radar signals to include chirps; and
wherein sampling the reflections includes using an analog to digital converter (ADC) to sample the reflections, including sampling the chips by generating target beat signals, amplifying and de-ramp mixing the reflections via the transmitted radar signals, and filtering of the received chirps.

11. The method of claim 10, further including generating range-Doppler maps via the range response, wherein ascertaining the positional characteristics includes conducting subsequent radar signal processing via the range-Doppler maps.

12. The method of claim 7, including, for the representations of the reflections,
converting an input sample vector of length N into a spectral domain by using a FFT;
oversampling the transformed representations of the reflections by computing branches of length-N complex-weighted IFFTs;
selecting ones of the oversampled representations that are nearest to a predefined index, relative to other ones of the oversampled representations; and
arranging the selected ones of the oversampled representations into an output sample vector.

* * * * *